May 23, 1939.  W. F. HORSCH ET AL  2,159,160
NUT LOCK
Filed Feb. 8, 1936
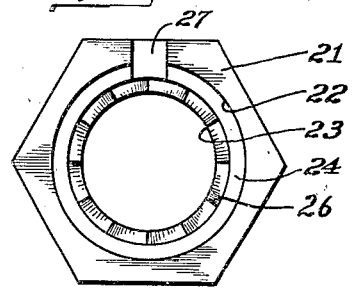
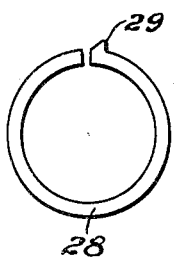
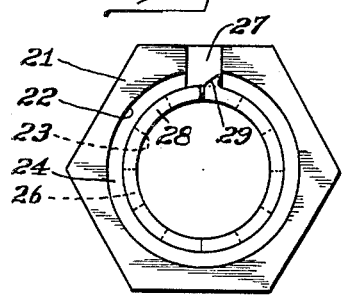
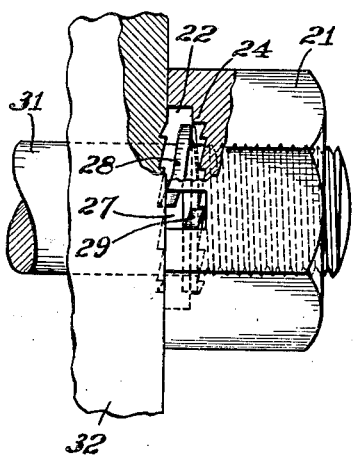
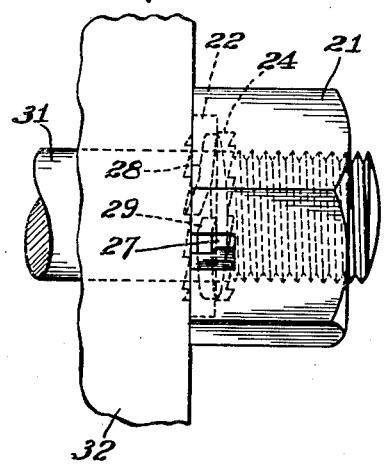
WITNESSES
A. B. Wallace.
V. A. Peckham.
INVENTORS
William F. Horsch
James M. Thompson
BY Brown, Critchlow & Flick
their ATTORNEYS

UNITED STATES PATENT OFFICE 2,159,160

NUT LOCK

William F. Horsch and James M. Thompson, Monessen, Pa.

Application February 8, 1936, Serial No. 63,022

1 Claim. (Cl. 151—41)

This invention relates to nut locks, and more particularly to those using lock washers of the helical split spring type for locking nuts on bolts.

Nut locks have been known heretofore in which a helical spring washer engages ratchet teeth on a nut and an adjoining member to thereby prevent the nut from being unscrewed from the bolt, but due to their construction they have been subject to serious disadvantages. For example, the two series of ratchet teeth may grind against each other or against the washer as the nut is tightened on the bolt and thereby wear or break themselves down so that they can not function. When the nut is turned down tight on the lock washer that member may be flattened so that it will not effectively lock the nut against reverse movement. The locking means is ordinarily exposed to destructive weather conditions.

It is among the objects of this invention to provide a nut lock in which a nut is securely locked on a bolt, in which the locking means is concealed and shielded from exposure, and also protected from being crushed between the nut and base, and in which the washer-engaging ratchet teeth are protected from destructive wear.

Accordingly, a nut is threaded on one end of a bolt extending through a bolt-receiving member, and is drawn up tightly against that member. One of the engaging faces of the nut and bolt-receiving member, preferably the nut, is provided with an annular recess having ratchet teeth in one wall. The portion of the other of said faces facing this recess is also preferably provided with ratchet teeth. A helical spring washer is disposed in the recess with its ends engaging the two sets of ratchet teeth to prevent the nut from being unscrewed from the bolt.

This invention is illustrated in the accompanying drawing, in which Fig. 1 is a view of the inner end of a modified nut; Fig. 2 is a plan view of a lock washer; Fig. 3 is a view similar to Fig. 1 showing the washer in the nut; Fig. 4 is a side view, partly broken away, of the nut and washer of Fig. 3 locked in place; and Fig. 5 is a view similar to Fig. 4 with the washer unlocked from the nut.

In Figs. 1 to 5 there is shown a nut lock of the type contemplated by this invention in which provision has been made for removing the nut without destroying it and without the use of a removable washer. As shown in Fig. 1, the inner face of a nut 21 is provided with an annular recess 22 encircling the bolt opening 23. The inner wall of this recess is provided with a shoulder 24 between which and the bolt opening is a series of ratchet teeth 26 the perpendicular faces of which face in a direction opposite to the direction of rotation of the nut when it is being screwed onto a bolt. Shoulder 24 spaces the teeth a fixed distance from the member 32 no matter how tightly the nut is screwed against it. Extending through the side wall of the recess is a slot 27 that also passes through the shoulder. A spring washer 28, as shown in Fig. 2, is of less thickness than recess 22 and has an outwardly projecting lug 29 on one end. Before screwing the nut into place this washer is placed in recess 22 with its lug projecting into slot 27 where it abuts against one end of shoulder 24 (Fig. 3). This end of the washer also engages one of the ratchet teeth. When the nut is screwed on a bolt 31 (Fig. 4) the washer is carried around by the nut by the engagement of the lug in the slot, and the nut is prevented from accidentally unscrewing by the engagement of the ends of the washer with the teeth in the nut and the member 32 which the nut engages.

The nut may thus be screwed up tight against member 32 without hindrance, and without completely flattening the washer, but unscrewing is normally prevented by the engagement of the ends of the helical washer with the perpendicular faces of the teeth on member 32 and the nut. It will be apparent from Figs. 4 and 5 that when the nut is tight against member 32 it has the appearance of an ordinary nut because the ratchet teeth and lock washer are completely concealed by shoulder 24. The locking means is thus protected to a large extent from exposure and corrosion, and also from malicious tampering, whereby safety is promoted and maintenance costs are decreased. Due to the fact that the thickness of the material from which the lock washer is made is less than the depth of recess 22, the two sets of ratchet teeth, which are held out of engagement with each other by shoulder 24, do not bear against the washer hard enough to be worn thereby. Consequently, the teeth are not worn out nor is the washer unduly bent or destroyed by grinding of the nut and member 32 against each other or against the lock washer.

However, due to the slot and shoulder, the nut can be unlocked and unscrewed. This is done by inserting a sharp tool, not shown, under the lug end of the washer at the inner end of slot 27, and raising this end of the washer to clear the teeth in the nut. This permits the nut to be turned backward far enough to allow lug 29 to engage the top of shoulder 24, as shown in Fig. 5. The lug end of the washer is thus held out of engagement with the nut teeth by the shoulder, and the nut can be turned backward as the shoulder slides against the lug.

According to the provisions of the patent statutes, we have explained the principle and mode of operation of our invention, and have illustrated and described what we now consider to represent its best embodiment. However, we desire to have it understood that, within the scope of the appended claim, the invention may be practiced otherwise than as specifically illustrated and described.

We claim:

In a nut lock, the combination of a bolt-receiving member provided with an opening therethrough, a bolt disposed in the opening, a nut threaded on the bolt and engaging said member, the inner face of the nut having an annular recess therein encircling the bolt, the inner wall of the recess being provided with a series of ratchet teeth encircled by a shoulder, the surface of said member opposite said teeth being provided with a series of ratchet teeth encircling the bolt and spaced from the teeth in the recess, and a helical spring washer disposed in the recess with its ends abutting against said teeth in the recess and said member for locking the nut on the bolt, said nut being provided with an opening through the side wall of said recess and passing through said shoulder, and said washer being provided at its nut-engaging end with a lug projecting into said side wall opening, said lug being adapted to be lifted out of engagement with said nut teeth by a tool inserted through said nut opening and to be held out of engagement with said nut teeth by said shoulder whereby the nut can be unscrewed from the bolt.

WILLIAM F. HORSCH.
JAMES M. THOMPSON.